July 20, 1954     J. BURNHAM     2,684,317
METHOD OF MAKING A RESIN-IMPREGNATED CAPACITOR
Filed Oct. 9, 1950
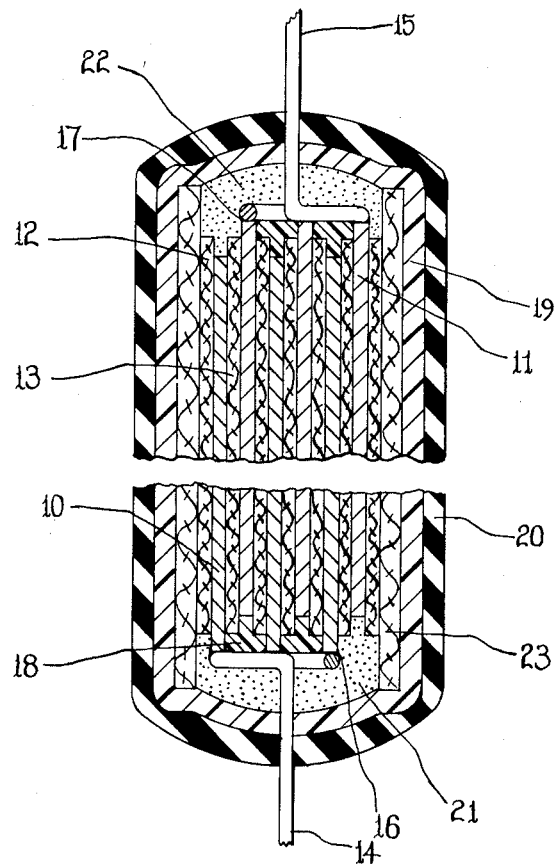
INVENTOR.
JOHN BURNHAM
BY
HIS ATTORNEY.

Patented July 20, 1954

2,684,317

UNITED STATES PATENT OFFICE 2,684,317

METHOD OF MAKING A RESIN-IMPREGNATED CAPACITOR

John Burnham, Williamstown, Mass., assignor to Sprague Electric Company, North Adams, Mass., a corporation of Massachusetts Application October 9, 1950, Serial No. 189,250

3 Claims. (Cl. 154—80)

This invention relates to capacitors that are impregnated with resin which is solidified in place to produce a thermosetting mass.

Cross-linked and thermosetting resins have been previously incorporated in condensers but have heretofore been not too satisfactory because of the frequent presence of cracks and voids in the completed condenser body, and also because the external surface of the cured resin-impregnated assembly has always been irregular, the resin on the surface appearing as if it has been preferentially flowed to one portion or end, producing a relatively thick unsightly glob or "drop." The curing of the impregnated resin during the hardening step has usually resulted in the development of voids within the condenser in spite of all precautions. In addition the impregnant before and during curing drips from the capacitor to spoil its appearance, and this cannot be prevented by wiping the surface of the impregnated capacitor prior to heat curing.

Among the objects of the present invention are novel techniques for avoiding the above difficulties, as well as to produce improved electrical capacitors.

The above as well as further objects of the invention will be more readily understood from the following description of several of its exemplifications, reference being made to the accompanying drawing wherein the figure is a sectional view of one form of condenser made in accordance with the present invention.

It has been discovered that polymerizable impregnants can be used to make void-free and drop-free impregnated capacitors if the condensers impregnated with monomer or low polymer are immersed in an inert liquid solvent for the impregnant, and the liquid is maintained at an elevated temperature until the resin becomes gelled and the peak of the exotherm is passed. The capacitor can then be removed from the liquid, dried, and baked in air till the curing is completed and the resin is fully solidified. The liquid solvent acts as a heat transfer medium to control the exothermic polymerization reaction and to remove excess solvent from the surface of the impregnated capacitor.

By way of example only, the following process has been found to produce excellent results. Two ribbons of aluminum foil 0.00025" thick, one inch wide and 72 inches long were convolutely wound in the conventional manner with two ribbons of calendered kraft paper 0.0005" thick and one inch wide. The foils were displaced transversely with respect to each other and with respect to the paper so that their opposite side margins extended out from the opposite ends of the wound assembly to provide the standard non-inductive capacitor section. Leads were then soldered to the respective side margins with aluminum solder and the entire section inserted in a cardboard tube. The ends of the tube were filled with a cement made up from 23 parts of melamine formaldehyde resin, 63 parts of ground silica, and 14 parts of water. The assembly was placed in a container which was evacuated to a pressure of 500 microns of mercury. While at this low pressure, the capacitor assembly was immersed in a liquid resin mixture (25° C.) having the following formulation:

Ingredient: Parts by weight
Propylene glycol fumarate (made by heating together stoichiometric proportions of fumaric acid and propylene glycol at 180° C. for 3 hours) _____ 80
Styrene _____ 70
Tertiary butyl hydroperoxide_____ 1

The pressure was then brought up to atmospheric and after a few minutes the sections were removed from the impregnant, and immersed in methyl isobutyl ketone held at 100–110° C. After thirty minutes of immersion in this liquid, the impregnant throughout the section was in the form of a semi-hard gel, and the assembly removed, dried and baked at 150° C. for three hours in a hot air oven.

The final assembly was hard and appeared to be fully cured. It was given a wax dip and was ready for use. It had a D. C. breakdown potential in excess of 3500 volts D. C., high leakage resistance and a life of over 500 hours at 125° C. under an applied potential of 600 volts D. C. Twenty capacitors made in this way were sawed in two and no voids could be detected within the capacitor section in any case. Their external surfaces had a uniform drop-free thin film of solid resin below the wax coating.

The figure of the drawing shows the final condenser. The foils are indicated at 10 and 11, the paper spacers at 12 and 13, the terminals at 14 and 15, and the soldered connections at 16 and 17. End cement 21 and 22 fill the ends of the capacitor, mechanically fixing the assembly with cardboard tube 23. The solidified impregnant 18 fills the spaces and pores in the entire capacitor and also extends as a thin film

10 over the exterior. A wax coating 20 covers this resin film.

In addition to the above detailed example, numerous other dielectric impregnants of the polymerizable type may be processed in accordance with the invention. As previously indicated, the medium should be inert to the polymerization reaction, a solvent for the impregnant under conditions of gelation, and liquid during the gelation reaction, so as to remove the exothermic heat generated by the impregnant during the polymerization reaction. Representative impregnants, processing mediums and gelation temperatures are indicated in the table which follows.

| Impregnant | Liquid Medium | Gelation Temp. and Time |
|---|---|---|
| N-vinyl carbazole+0.5% benzoyl peroxide. | p-xylene | 1 hour at 115° C. |
| 98% styrene; 2% p-divinyl benzene | di-n-butyl ketone | 45 minutes at 100° C. |
| 2,3,4,5,6-pentachlorostyrene | propylene glycol | 2 hours at 125° C. |
| 90% ethylene glycol fumerate; 9% styrene; 1% tert-butyl hydroperoxide. | ethylene-glycol-mono-methyl ether acetate. | 90 min. at 110° C. |
| vinyl dibenzofuran plus 0.3% acetyl peroxide. | triacetin | 40 min. at 135° C. |

Similar results may be obtained when alcohols, ethers, esters, aldehydes, ketones and other inert liquids, including hydrocarbons, are used as the immersion control mediums, either by themselves or in mixtures, selected in accordance with invention.

Examples of these liquids are:

Ethyl isobutyl ketone
Di-isobutyl ketone
Di-n-butyl ketone
Ethylene glycol mono-methyl ether
Ethylene glycol mono-methyl ether acetate
n-Amyl alcohol
Di-n-butyl ether
Ethyl butyrate
Tetralin
Methyl benzyl ether
Methyl benzoate
Benzyl alcohol
Methyl betachloro propionate
Benzaldehyde
Nitrobenzene
Methyl m-chloro benzoate
Diethyl carbonate
Anisole
Durene
Methyl lactate
Cyclohexanol
Cyclohexanone
Propylene glycol
Acetal
Dioxane
Beta chloro-ethyl acetate
O-terphenyl With some liquids such as n-propyl alcohol and methyl ethyl ketone superatmospheric pressures can be used to raise their boiling points and provide an effective resin gelling treatment. Ordinarily temperatures between about 80° C. and 160° C. are employed to effect gelation.

The selection of the liquid medium depends, of course, upon the particular polymerizable materials employed as impregnants. It is normally preferable to employ higher boiling materials with the resins which require higher temperatures for gelation. Many of the liquid mediums are not particularly effective solvents for the impregnants at normal temperatures, but under the conditions of gelation, the solvent effect should be sufficient to remove the excess impregnant which is found on the outer surface of the capacitor section. It should be recognized that the porosity of the capacitor structure is an important factor in the selection on a solvent. For example, the medium employed in an uncased capacitor section should not penetrate the capacitor winding appreciably due to its solvent action. Where a molded casing is employed, better solvents may be safely employed, as for example, xylene for styrene impregnants, etc.

In addition to the solute-solvent interactions which have been discussed above the viscosity and heat conductivity of the solvent is of importance and should be chosen to give the maximum heat transfer from the component to the bulk of the liquid.

The exothermic polymerization reaction leads to appreciable heat formation. The rate of transfer of this heat to the liquid depends upon the initial ambient polymerization temperature, the structural configuration of the capacitor, etc., as well as the nature of the solvent. The gelation point referred to herein means the point at which impregnant dripping will no longer take place and at which the peak of the exotherm is passed. Extremes may be met in the case of impregnants containing substantial quantities of "active" polymerizants such as 2,5-dichlorostyrene, divinyl benzene and the like. To improve the heat transfer action, agitation of the liquid medium may be necessary.

The housing for the capacitor or other electrical device may be a cardboard tube, usually with a semi-porous end cement, which in turn may be provided with an eyelet to facilitate impregnation; a molded thermosetting resin casing; a metal can with terminal eyelets; a glass or insoluble resin tube with metal end caps or other type of housing conventionally applied for such devices.

It should be further understood that the invention is not limited to electrical capacitors; transformers, coils and even resistors impregnated with the impregnants described herein may be processed in accordance with the invention.

The resins employed herein are polymerizable compounds containing one or more unsaturated carbon double bonds. The materials may be employed per se or as mixtures with other polymerizable materials. In addition, low polymers of such materials may be employed; ordinarily, however, the invention overcomes the necessity of separate pre-polymerizations of materials, since the exothermic reaction encountered during the initial phases effects no disadvantage when the present invention is employed. Polymerizable vinyl compounds, based on the aromatic, aliphatic and heterocyclic nuclei and unsaturated polyesters are representative starting materials.

Details of the ester production are described in the Ellis Patent No. 2,255,313 granted September 8, 1941, which also shows polymerization mixtures, catalysts and stabilizers that can be used. In addition to these catalysts and the tertiary butyl hydroperoxide described above, acetyl peroxide, benzoyl peroxide and lauryl peroxide have been found effective with the present invention.

The impregnation can be performed at pressures higher or lower than 500 microns of mercury. The impregnation can be repeated, particularly if the pressures are cycled.

As many apparently widely different embodiments of this invention may be made without departing from the spirit and scope hereof, it is to be understood that the invention is not limited to the specific embodiments hereof, except as defined in the appended claims.

What is claimed is:

1. In a method of making a capacitor, the steps of providing a capacitor section having electrodes separated by porous spacer elements, impregnating the capacitor section with at least one polymerizable material, immersing the impregnated section in an inert liquid medium which is a solvent for said polymerizable material, said immersing being effected at a temperature above 80° C. until the impregnant within the section has become gelled, removing from said solvent and then heating the resulting section till the impregnant is completely cured.

2. A method of making a capacitor including the steps of rolling up an armature assembly with porous spacing material; impregnating the rolled assembly with a liquid mixture of styrene and linear polyester of an acid selected from the class consisting of maleic and fumaric acids; washing the impregnated assembly with a ketone heated to about 100° C. to remove excess impregnant from the surface of the assembly and effect gelation of the impregnant; and then withdrawing the assembly from the ketone and heating the withdrawn assembly to complete the curing of the impregnant.

3. A process of making a capacitor comprising the steps of rolling up an armature assembly with porous spacing material, impregnating the rolled assembly with a liquid mixture of styrene and propylene glycol fumarate, and a peroxide polymerization catalyst, immersing the impregnated assembly for a period of about 30 minutes in methyl isobutyl ketone at from about 100 to about 110° C. so as to form a semi-hard gel of the impregnant throughout said assembly, withdrawing the assembly from ketone and heating the withdrawn assembly at about 150° C. for about 3 hours to complete the curing of the impregnant.

References Cited in the file of this patent

UNITED STATES PATENTS

| Number | Name | Date |
|---|---|---|
| 2,350,743 | Fordyce | June 6, 1944 |
| 2,479,357 | Hill | Aug. 16, 1949 |
| 2,520,173 | Sanders | Aug. 20, 1950 |
| 2,549,309 | Hill | Apr. 17, 1951 |

FOREIGN PATENTS

| Number | Country | Date |
|---|---|---|
| 416,735 | Great Britain | Sept. 20, 1934 |
| 596,151 | Great Britain | Dec. 30, 1947 |
| 597,218 | Great Britain | Jan. 21, 1948 |